United States Patent Office 3,149,110
Patented Sept. 15, 1964

3,149,110
PREPARATION OF PTERIDINE DERIVATIVES
John C. Goossens, Harvey, Ill., assignor to Standard Oil Company, Chicago, Ill., a corporation of Indiana
No Drawing. Filed Feb. 18, 1959, Ser. No. 793,984
12 Claims. (Cl. 260—251.5)

This invention relates to pteridine derivatives, particularly to a novel method of preparing certain pteridine derivatives for use as thickeners in lubricant greases destined for high temperature service.

In the lubrication of mechanical equipment at temperatures above 300–400° F. with lubricant greases, it is essential that the grease be composed of a thermally stable lubricant oil vehicle and a refractory thickener. Many lubricant oils such as those of the silicone polymer type are ideally suited for this purpose. Unfortunately, most grease thickeners suitable for use at ordinary temperatures are completely useless above about 400°.

Only recently, certain thickeners have been discovered which are capable of withstanding temperatures well in excess of 400° F. and in some instances can be used at 600–700° F. and higher. Among the outstanding of these are the pteridine derivatives. Unfortunately, pteridine derivatives are notoriously "difficult substances to manipulate in the organic laboratory" (Kirk and Othmer, "Encyclopedia of Chemical Technology," volume 7, page 445.) The methods of preparation heretofore available (Cain et al., Journal of the American Chemical Society, vol. 68, p. 1996, 1946; U.S. Patent 2,822,334) involve the use of large volumes of ethanol or MEK, or special materials such as dimethyl sulfoxide as a reaction solvent. The large volumes of EtOH or MEK are inconvenient, and dimethyl sulfoxide is strongly occluded by the pteridine product; if not entirely removed, dimethyl sulfoxide thermally decomposes to foul-smelling residues. Moreover, the reaction conducted in dimethyl sulfoxide requires close temperature control to obtain a satisfactory thickener.

I have now discovered that pteridine derivatives having the structural formula, hereinafter designated as (I)

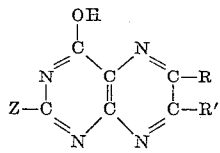

where Z is selected from the group OH and NH₂ radicals and R and R' are each selected from the group hydrogen, alkyl, aryl, and furan radicals and nitro and halogen derivatives of said aryl radicals, which pteridine derivatives are prepared by reacting a bisulfite or sulfate derivative of the corresponding pyrimidine, having the formula, hereinafter designated as (II), of

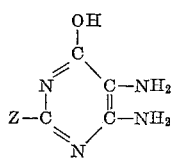

with the corresponding vicinal dicarbonyl compound having the formula (III)

can be recovered in substantially higher yields when the reaction is conducted in the presence of a solvent for the reactants selected from the group aliphatic polyhydric alcohols and ether derivatives thereof, and in the additional presence of an alkaline material. That is in contrast to indications in the prior art (Kirk and Othmer, Encyclopedia of Chemical Technology, vol. 7, p. 454) which teaches that the reaction is best conducted in an acid, rather than an alkaline solvent or medium. In addition, the pteridine derivative thus obtained is quite pure. When employed as a grease thickener, which requires fine crystal size, such size may be obtained by dissolving the derivative in an alkaline solution of aqueous alcohol and reprecipitating the derivative by neutralizing the solution.

As a totally unexpected advantage of the instant invention, it has been discovered that pteridine derivatives prepared according to the inventive process are recovered in an oleophilic state, and have enhanced grease thickening power. In addition, the greases possess outstanding mechanical stability in comparison with dimethyl sulfoxide-prepared greases.

The preparation of pteridine derivatives by reacting bisulfite or sulfate derivatives of a pyrimidine (II) with a vicinal dicarbonyl compound has been adequately described in the literature (Cain, supra; Wieland, Ann., 507, 226, 1933); and the use of pteridine derivatives as thickeners for high temperature lubricant greases is now known (U.S. 2,822,334). Illustrative of the pteridine derivatives, all of which can be prepared by the inventive process using aliphatic polyhydric alcohols and their ether derivatives as solvents, there may be mentioned the following:

2-amino-4,6,7-trihydroxy pteridine (leucopterin)
2,4,6,7-tetrahydroxypteridine (desaminoleucopterin)
2-amino-4-hydroxy pteridine
2-amino-4-hydroxy-6,7-(1,8-naphthalene)-pteridine
2-amino-4-hydroxy-6,7-(2,2-biphenylene)-pteridine
2-amino-4-hydroxy-6,7-diphenyl pteridine
2-amino-4-hydroxy-6,7-di(3-nitrophenyl)-pteridine
2-amino-4-hydroxy,6,7-di-(2-chlorophenyl)-pteridine
2-amino-4-hydroxy-6,7-di(2-furan)-pteridine As previously indicated, the novel solvents for the reaction in which the pteridine derivatives are prepared are characterized by being aliphatic polyhydric alcohols or the ether derivatives thereof. Among the polyhydric alchols are the glycols, such as ethylene glycol, propylene glycol, 2-ethylhexanediol-1,3, pentanediol-2,4, 2-methyl pentanediol-2,4, octylene glycol, etc. A sub-genus of the glycols are the polyalkylene glycols, which may be considered as ethers prepared by condensing two or more glycols; these include diethylene glycol, dipropylene glycol, triethylene glycol, etc. The glycols and polyalkylene glycols are useable in molecular weights up to about 1,000, although the molecular weight of the solvent or solvent mixture is preferably below about 200.

Another suitable class of solvents are the glycol ethers, which are monoalkyl or polyalkyl ethers of a glycol. Illustrative glycol ethers include the alkyl ethers such as 2-methoxymethyl-2,4-dimethyl pentanediol-1,5, 2-ethoxymethyl-2,4-dimethyl pentanediol-1,5, etc.; ethylene glycol monomethyl ether (available under the trademark "Cellosolves" from the Carbide and Carbon Chemicals Co.), ethylene glycol monoethyl ether, ethylene glycol monobutyl ether, diethylene glycol monoethyl ether, diethylene glycol monomethyl ether, diethylene glycol monobutyl ether, etc. Polyhydric alcohols having more than two hydroxy groups per molecule are also suitable solvents for use herein; in many instances they are outstanding for this purpose. Illustrative trihydric and high polyhydric alcohols are glycerol (1,2,3-propanetriol), erythritol, pentaerythritol, arabitol, xylitol, quercitol, etc. Members of the foregoing groupings which are liquid at room temperatures and stable at reaction temperatures of say 100–150° C. are especially preferred solvents.

The reaction is greatly accelerated when conducted in a solvent which is made alkaline. Apparently, the alkalinity serves mostly to eliminate the sulfuric or sulfurous acids which are obtained as byproducts. Alkaline materials which are soluble in the reaction solvent are especially preferred because of ease of handling. Thus the amine salts of weak organic acids, such as the tertiary amine salts of acetic acid such as triethyl ammonium acetate, tributylamine oleate or diethylcyclohexylamine acetate may be used. Other basic materials, especially the organic bases, may be substituted, and these illustratively include brucine, diethylamine, dipropylamine, pyridine, etc. Suitable inorganic bases include sodium bicarbonate, sodium acetate, potassium carbonate, potassium hydroxide, etc.

Briefly, the inventive preparation can be carried out as follows:

A solution of the bisulfite or sulfate derivative of the pyrimidine (II) and approximately a stoichiometric equivalent of the vicinal dicarbonyl compound are introduced in a vessel together with sufficient amounts of a solvent of the invention such as glycerine and an alkaline material such as triethyl ammonium acetate (which may be formed in situ). The mixture may then be heated to a temperature within the range of about 100–160° C., more desirably about 120–135° C. for a period of several hours, e.g. about 1–6 hours, to carry the reaction to completion. As the reaction begins, precipitation occurs. At the end of the reaction period, the reaction mass is cooled to room temperature. It may be diluted with a volatile organic solvent such as methanol to provide a more readily filterable mixture. The mixture is filtered to remove the solid pteridine derivative (I), which can be further washed with a volatile organic solvent such as methanol, acetone, etc.

While a grease can be prepared by simply milling the dry pteridine derivative with the desired amount of a lubricant vehicle, it is preferred to employ an additional processing step, viz. reprecipitation of the pteridine derivative from an alkaline solution of aqueous alcohol.

The pteridine derivative is dissolved in a solvent comprising a lower alcohol, e.g. 1–4 carbon atoms per molecule, and water, desirably in the proportions of 5–50% water by volume, optimally 10–30% water, which contains at least a stoichiometric amount of an alkali to dissolve the pteridine derivative. (It has been found that pteridine derivatives are not appreciably soluble in pure water or in pure alcohol, irrespective of alkalinity.) Alkaline materials are conveniently the alkali metal hydroxides, such as NaOH, KOH, etc. The pteridine derivative is then reprecipitated to secure fine crystal size by rapidly neutralizing the solution with an acid such as acetic acid, HCl, etc., so as to obtain fine crystal particles.

The reprecipitated pteridine derivative is filtered and then preferably washed with a volatile organic solvent, which may be the same solvent employed to wash the initially prepared pteridine derivative. The washed and moist pteridine derivative is then mixed with the lubricant vehicle, the remaining volatile organic solvent removed by evaporation or distillation, and the resulting paste then milled as on a three-roll mill or homogenizer.

When used as grease thickeners the herein defined pteridine derivatives may be present in an amount ranging from about 5% to about 60% and preferably from about 10% to about 40% of the grease composition. The balance of said grease composition is a high boiling normally liquid oleaginous lubricant vehicle, and may contain one or more well known addition agents in minor amounts, stable under the existing conditions of use, to impart various desired properties to the grease. Addition agents may be anti-oxidants, extreme pressure agents, corrosion inhibitor, anti-leak agents, anti-foam agents, graphite, molybdenum sulfide, etc.

Oleaginous lubricant vehicles which can be thickened with the herein described pteridine derivative to form greases, can be silicone polymer oils, mineral lubricating oils, synthetic hydrocarbon lubricating oils, synthetic lubricating oils such as polyalkylene glycols and their derivatives, high molecular weight esters of dicarboxylic acids, polyfluoro derivatives of organic compounds such as the trifluorovinyl chloride polymers known as "Fluorolube" (made by Hooker Chemical Company) and the trifluorochloroethylene polymers, known as "Kel-F," and other lubricant vehicles.

The silicone polymer oils which may be employed in accordance with the present invention are those falling substantially within the lubricating oil viscosity range. In general, such oils have the following unit structure:

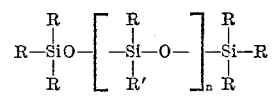

wherein R and R′ represent substituted or unsubstituted alkyl, aryl, alkylaryl, arylalkyl or cycloalkyl radicals. Such compounds may be produced by well-known methods, e.g. the hydrolysis of dialkyl dichlorosilanes or dialkyl diethoxysilanes with a suitable chain stopper, e.g. a trisubstituted mono-chlorosilane. For purposes of the present invention, those polymers which are high boiling liquids within the lubricating oil viscosity range are suitable, these generally possessing a viscosity at 100° F. which is within the range of from about 25 to about 3500 S.S.U. It is preferred, for purposes hereof, to employ such oils as have a viscosity at 100° F. of from about 100 S.S.U. to about 1250 S.S.U. Such products are generally colorless and inert, have a very low volatility and undergo relatively slight change in viscosity for a given change in temperature. Relatively common oils of this type are dimethylsilicone polymer, phenylmethylsilicone polymer, chlorophenylmethylsilicone polymer, etc., it being preferred to employ either the phenylmethylsilicone or the chlorophenylmethylsilicone polymer in accordance herewith. Methods of preparing such compounds are taught in numerous patents, e.g. U.S. 2,410,346, U.S. 2,456,496, and in the literature such as "Chemistry of the Silicones," by Rochow, page 61 et seq. A particularly desirable phenylmethylsilicone polymer for use in accordance with the present invention is Dow-Corning 550 Silicone Fluid, a product of Dow-Corning, Inc., which has a Saybolt Universal viscosity at 100° F. of about 300 to about 400 seconds. Another suitable silicone polymer is a chlorophenylmethylsilicone marketed as GE 81406 by General Electric Company.

Other oleaginous vehicles which may be employed herewith are, for example, mineral oils in the lubricating oil viscosity range, i.e. from about 50 S.S.U. at 100° F. to about 300 S.S.U. at 210° F. These mineral oils are preferably solvent extracted, to substantially remove the low V.I. constituents, e.g. aromatics, with phenol, furfural, B,B′-dichloro diethylether (Chlorex), liquid $SO_2$, nitrobenzene, etc. Synthetic lubricating oils resulting from polymerization of unsaturated hydrocarbons or other oleaginous materials within the lubricating oil viscosity range such as high molecular weight polyoxyalkylene compounds such as polyalkylene glycols and esters thereof, aliphatic diesters of dicarboxylic acids such as the butyl, hexyl, 2-ethylhexyl, decyl, lauryl, etc. esters of sebacic acid, adipic acid, azeleic acid, etc., may be thickened by the pteridine compounds of the present invention to produce excellent greases. Polyfluoro derivatives of organic compounds, particularly hydrocarbons, and dibasic acid esters of $H(CF_2)_nCH_2OH$, in the lubricating oil viscosity range can be thickened with compounds of the present invention. Other synthetic oils, such as esters of aliphatic carboxylic acids and polyhydric alcohol, e.g. trimethylolpropane pelargonate and pentaerythritol hexanoate, can be used as suitable oil vehicles. Where the grease product is to be employed under high temperature conditions lubricating oils which are stable, i.e. do not decompose, at the temperatures to encountered should be used as the lubricant vehicle. For such uses, it is preferred to use oils such as the silicone polymers, the diesters of dicarboxylic acids, and the like.

The preparation of exemplary pteridine derivatives is illustrated by the following examples. The preparation and testing of pteridine derivatives and their resultant greases, using prior-art techniques, are identified by "tests."

EXAMPLE 1

A solution consisting of glycerine and triethyl ammonium acetate was used in preparing 2-amino-4-hydroxy-6,7-diphenyl pteridine. A mixture of 300 ml. of C.P. glycerine, 8 grams of triethyl amine, and 4.8 grams acetic acid was prepared; to this solution, 28 grams (0.147 equivalent) of 2,4,5-triamino-6-hydroxy pyrimidine sulfate (Z in Formula (II) is NH$_2$; material obtained from Sigma Chemical Co.), and 40 grams (0.19 equivalent) of benzil were added. The resultant mixture was heated at 120° C. for 3 hours; thereafter it was cooled to room temperature, diluted with one liter of methanol, stirred well, and suction filtered to collect the product. The solid product was washed with 200 ml. methanol at room temperature and dried. The yield was 33 grams of 2-amino-4-hydroxy-6,7-diphenyl pteridine, representing a molar yield of 71.3% based on the pyrimidine sulfate used.

Test 1

In an analogous reaction, employing the prior art method (U.S. 2,822,334, Example I) 2-amino-4-hydroxy-6-diphenyl pteridine was prepared in dimethyl sulfoxide.

To a saturated solution of 5 grams (0.026 equivalent) 2,4,5-triamino-6 hydroxy pyrimidine sulfate in 100 ml. of dimethyl sulfoxide, 6 grams (0.029 equivalent) of benzil was added. The mixture was heated at 120–125° C. for about five hours to carry the reaction to completion. At the end of this time, the reaction mass was poured into a large excess of water to precipitate the reaction product, which was filtered, washed with acetone, and dried. The yield of 2-amino-4-hydroxy-6,7-diphenyl pteridine was 62.5 percent.

The pteridine derivative prepared in Example 1 was dissolved in a solvent consisting of 80 volume percent ethanol and 20 volume percent water, which contained about 5% by weight of sodium hydroxide. The pteridine derivative was then precipitated in very fine particle sizes by rapid neutralization with the stoichometric amount of acetic acid diluted with 2–3 times its volume of ethanol. The fine particles of the pteridine derivative were collected, washed with acetone, mixed in moist condition with DC–550 Silicone fluid, and heated to evaporate the acetone. The grease contained 23% derivative as thickener, and had an ASTM penetration of 231. An analogous 23% 2-amino-4-hydroxy-6,7-diphenyl pteridine grease prepared in Test 1 (prior part) had a penetration of only 276.

EXAMPLE 2

In this example, 2-amino-4-hydroxy-6,7-di(2-chlorophenyl)-pteridine was prepared from 2,4,5-triamino-6-hydroxy pyrimidine sulfate and o,o'-dichlorobenzil. A solution of 300 ml. glycerine, 10 grams of triethyl ammonium acetate, 20 grams (0.105 equivalent) of the pyrimidine sulfate, and 32 grams (0.115 equivalent) of o,o'-dichlorobenzil was heated at 140° C. for 2 hours. The reaction mixture was cooled to room temperature, diluted with methanol, stirred and suction filtered to collect the product. The solid product was washed with 250 ml. methanol and dried. The yield was 35.4 grams of 2-amino-4-hydroxy-6,7-di(2-chlorophenyl) - pteridine representing a yield of 87.5%.

The pteridine derivative prepared in this example was used in manufacturing a silicone based grease. The pteridine derivative was first reprecipitated from an alkaline solution of aqueous alcohol as in Example 1 and milled with DC–550 Silicone Fluid in 20% thickener concentration. The grease had ASTM penetration of 325. Upon testing in the CRC L–35 bearing test at 450° F., a 566 hour test was obtained. This is about 200 hours in excess of the test life obtained with an analogous grease made with 2-amino-4-hydroxy-6,7-di-(2-chlorophenyl)pteridine prepared in dimethyl sulfoxide.

A second chlorophenyl pteridine grease was prepared in accordance with Example 2 and after reprecipitation from alkaline alcohol-water solution, the grease contained 22% thickener, the balance being DC–550 Silicone Fluid and having an ASTM penetration of 284. In bearing tests, using the L–35 procedure except being run at 600° F., it ran 24 hours to failure in air, and 91 hours when a slow stream of nitrogen was passed over the bearing.

EXAMPLE 3

In this example, 2-amino-4-hydroxy-6,7-di-(2-furan)-pteridine was prepared from 2,4,5-triamino-6-hydroxy pyrimidine sulfate and furil.

A mixture of 150 ml. glycerine, 12 grams of triethylammonium acetate, 14 grams (0.074 equivalent) of the pyrimidine sulfate and 14 grams (0.074 equivalent) of furil were heated at 120° C. for 2.5 hours, cooled, diluted with ½ liter of methanol, stirred and suction filtered. The solid material was washed and dried. Yield was 15.8 grams of 2,4-aminohydroxy-6,7-di-(2-furan)-pteridine, a yield of 72.4%.

To demonstrate the refractory ability of the furan pteridine, a sample of the olive drab colored material was placed in a melting point capillary and heated; it remained unmelted up to the maximum temperature of the heater, 680° F. A DC–550 Silicone grease thickened with 20% of the reprecipitated furan pteridine ran 146 hours to failure in the 450° F. L–35 bearing test.

EXAMPLES 4–9

In several additional examples, various solvents and bases were employed in the preparation of a pteridine derivative from benzil and pyrimidine sulfate. The procedure employed was to add 2.8 gm. pyrimidine sulfate and 4.0 gm. benzil to 2.5 gm. of the particular base and 30 ml. of the solvent. The mixtures were heated for 3 hours at 120° F., and the following results were obtained.

| Run | Solvent | Base | Yield, percent |
|---|---|---|---|
| Example 4 | Glycerine | Tributylamine | 71.3 |
| Example 5 | do | Diethylcyclohexylamine | 70.0 |
| Example 6 | do | Na$_2$CO$_3$ | 71.6 |
| Example 7 | Diethylene glycol | Tributylamine | 70.3 |
| Example 8 | Ethylene glycol | do | 70.6 |
| Example 9 | "Carbitol" | do | 64.5 |

In place of the 2,4,5-triamino-6-hydroxy pyrimidine sulfate used in the above examples, the 2,4,5-triamino-6-hydroxy pyrimidine bisulfite can be used.

I claim:
1. In the method of preparing a pteridine derivative having the structural formula of

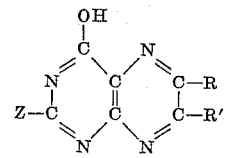

where Z is selected from the group consisting of OH and NH$_2$ radicals and R and R' are each selected from the group consisting of hydrogen, alkyl, aryl, and unsubstituted furyl radicals, said preparation being effected by reacting a member of the group consisting of the bisulfite and the sulfate salts of a pyrimidine having the structural formula of

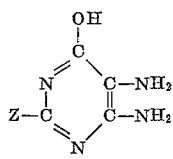

where Z is as above defined, with a vicinal dicarbonyl compound having the formula

where R and R' are as above defined, the improvement which comprises carrying out said reaction in the presence of a solvent selected from the group consisting of alkylene glycols and their lower alkyl ethers in the presence of an alkaline compound.

2. Method of claim 1 wherein said solvent is glycerine.
3. Method of claim 1 wherein said solvent is an ethylene glycol.
4. Method of claim 1 wherein said solvent is a propylene glycol.
5. Method of claim 1 wherein said solvent is a lower alkyl ether of ethylene glycol.
6. Method of claim 1 wherein said solvent is a lower alkyl ether of diethylene glycol.
7. Method of claim 1 in which the basic compound is an amine salt of a weak organic acid.
8. Method of claim 1 in which the basic compound is an amine.
9. Method of claim 1 in which the basic compound is an inorganic alkali metal basic compound.
10. Method of claim 1 in which the pyrimidine sulfate is 2,4,5-triamino-6-hydroxy pyrimidine sulfate, the vicinal dicarbonyl compound is benzil, the solvent is glycerine and the basic compound is triethyl ammonium acetate.
11. Method of claim 1 in which the pyrimidine sulfate is 2,4,5-triamino-6-hydroxy pyrimidine sulfate, the vicinal dicarbonyl compound is o,o'-dichlorobenzil, the solvent is glycerine and the basic compound is triethyl ammonium acetate.
12. Method of claim 1 in which the pyrimidine sulfate is 2,4,5-triamino-6-hydroxy pyrimidine sulfate, the vicinal dicarbonyl compound is furil, the solvent is glycerine and the basic compound is triethyl ammonium acetate.

References Cited in the file of this patent

UNITED STATES PATENTS

| | | |
|---|---|---|
| 2,547,519 | Boothe | Apr. 3, 1951 |
| 2,767,181 | Fahrenback et al. | Oct. 16, 1956 |
| 2,816,109 | Sletzinger et al. | Dec. 10, 1957 |
| 2,822,334 | Swakon et al. | Feb. 4, 1958 |
| 2,880,176 | Roach et al. | Mar. 31, 1959 |

OTHER REFERENCES

Cain et al.: J. Amer. Chem. Soc., vol. 68 (1946), pp. 1996–9.

Fieser: Organic Chemistry, third edition, 1956, pages 111, 113 and 122–124.